Oct. 23, 1962
T. C. RUSCONI
3,059,435
MASTER CYLINDER FOR HYDRAULIC SYSTEMS
Filed July 25, 1961
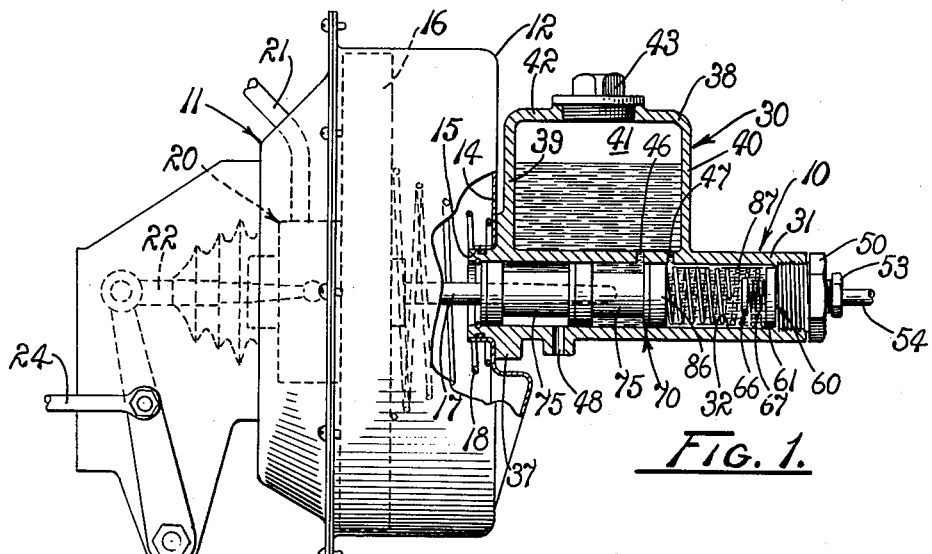
FIG. 1.
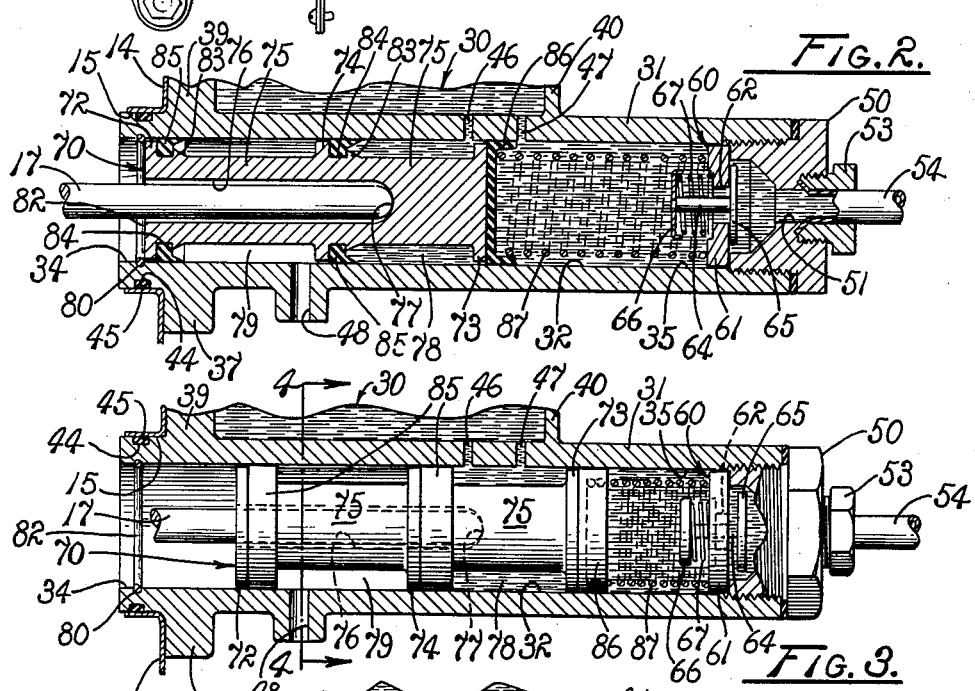
FIG. 2.
FIG. 3.
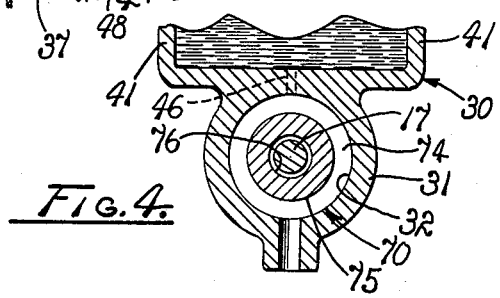
FIG. 4.
THEODORE C. RUSCONI
INVENTOR
HUEBNER & WORREL
ATTORNEYS
BY *Richard M. Worrel*

United States Patent Office 3,059,435
Patented Oct. 23, 1962

3,059,435
MASTER CYLINDER FOR HYDRAULIC SYSTEMS
Theodore C. Rusconi, 927 W. Fairmont, Fresno, Calif.
Filed July 25, 1961, Ser. No. 126,652
3 Claims. (Cl. 60—54.6)

The present invention relates to a master cylinder for hydraulic systems and more particularly to such a cylinder having a piston mounted for reciprocation in the cylinder and having fluid under varied pressures at opposite ends thereof in which the cylinder and piston have unique facility for resisting leakage incident too said pressure differential.

Conventional hydraulic master cylinders, particularly of the type employed in vehicle brake systems, have in the past been subject to certain well-known difficulties. The reciprocating pistons employed therein are difficult to seal and wear at a rapid rate due to repetitious use. When the seal fails, leakage from the high pressure, or wheel cylinder end, of the master cylinder past the piston to the low pressure, or brake pedal actuating, end of the cylinder occurs. This problem is particularly onerous in power brake installations wherein the master cylinder is mounted directly on a power cylinder which utilizes vacuum from the vehicle engine to augment the brake pedal force applied to the master cylinder. When the above described master cylinder leakage occurs in such environment, brake fluid is pulled by the vacuum in the power cylinder into the engine which results in faulty brake operation as well as considerable damage to the engine.

It is therefore an object of the present invention to provide an improved master cylinder for hydraulic systems.

Another object is to provide an improved master cylinder for hydraulic systems for controlling the application of vehicle brakes.

Another object is to provide a master cylinder which more readily seals the operating fluid therein than is possible with conventional cylinders of the type.

Another object is to provide a hydraulic master cylininder which effectively exhausts any residual leakage without contamination of associated structure.

Another object is to provide a hydraulic master cylinder is readily adaptable to existing hydraulic systems.

Another object is to provide a hydraulic master cylinder which is readily adapted to vacuum operated power actuated systems and which effectively precludes intermixing of hydraulic operating fluid from the vacuum actuating pressures.

Another object is to provide a hydraulic master cylinder having a piston dividing the cylinder between the high pressure operating fluid end and the low pressure actuating end.

Another object is to provide a hydraulic master cylinder with a piston providing an intermediate pressure zone between the high and low pressure ends to preclude or minimize intermixing of the end pressures.

Another object is to provide a hydraulic master cylinder providing a port opening to the atmosphere from the intermediate pressure zone to exhaust any residual leakage from the cylinder.

Another object is to provide a hydraulic master cylinder which is economically manufactured, readily installed, and requires at minimum of maintenance during operation.

These and other objects of the present invention will become more fully apparent in the subsequent description in the specification.

In the drawings:

FIG. 1 is a central section taken longitudinally of the master cylinder of the present invention shown associated with a vacuum operated power brake unit of conventional design.

FIG. 2 is a somewhat enlarged fragmentary section of the master cylinder of FIG. 1 shown in one position of operation.

FIG. 3 is a sectional view similar to FIG. 2 showing the master cylinder in another position of operation.

FIG. 4 is a transverse vertical section taken on line 4—4 of FIG. 3.

Referring more particularly to the drawing, a hydraulic master cylinder embodying the principles of the invention is indicated generally by the reference numeral 10. As shown in FIG. 1, the master cylinder is operationally associated with a vacuum power brake unit 11 which is of conventional design. While the master cylinder 10 is shown and described in the illustrative embodiment, it will become apparent that it also has utility in numerous other installations such as in machine tools and for operating numerous power accessories on vehicles and the like.

Although it does not constitute an essential to the present invention, it is believed desirable preliminarily to describe the power brake unit 11 in some particularity. Such unit provides a hollow cylindrical vacuum housing 12 having a forward wall portion 14. The forward wall includes a circular inwardly turned flanged opening 15 for purposes soon to become apparent. A power piston, indicated by the dashed lines 16, is disposed for reciprocating movement within the housing 12 and concentrically mounts a substantially longitudinally extended push rod 17 which extends outwardly from the housing 12 through the flanged opening 15. A conical return spring 18 is interposed between the piston and the forward wall of the housing normally to hold the piston in a brake off position otward the left, as viewed in FIG. 1. A control valve, indicated by the dotted lines 20, is mounted in the housing to control the power piston 16 and includes a vacuum inlet tube 21 which is connected to the inlet manifold of the engine of the vehicle, not shown. The control valve is actuated by a valve operating rod 22 axially aligned with the push rod 17 and operationally connected to a system of brake pedal actuating linkage generally indicated at 24.

The master cylinder 10 of the present invention includes a housing 30 providing an elongated cylindrical portion 31 through which is formed a concentric cylindrical bore 32. The cylindrical portion of the housing provides opposite inner and outer ends 34 and 35 and an integral annular flange 37 circumscribing the cylinder closely adjacent the inner end. The upper portion of the flange, as viewed in FIG. 1, is outwardly extended from the cylinder to form a fluid reservoir 38. The reservoir includes a rear wall 39, a forward wall 40, opposite side walls 41 and an upper wall 42. A filler plug 43 is screw-threadably received within the upper wall of the reservoir to provide a suitable opening through which hydraulic fluid may be added. The inner end of the cylinder is tightly fitted within the circular flanged opening 15 of the vacuum cylinder housing 12 with the bore 32 communicating therewith. The flange 37 of the cylinder engages the outer wall 14 and is rigidly secured thereto as by welding, by capscrews, not shown, or by other suitable means. An annular groove 44 and seal ring 45 are disposed about the periphery of the inner end 34 of the cylinder in sealing engagement with the circular flanged opening 15. A fluid by-pass port 46 provides communication between the bore 32 and the reservoir as does a longitudinally spaced orifice 47 communicating therebetween. A diametrically opposed exhaust port 48 opens outwardly through the cylinder from the bore to the atmosphere at a position intermediate the flange 37 and the by-pass port 46.

The outer end 35 of the cylinder is internally screw-threaded to receive a hex head fitting 50. The fitting includes a concentric bore 51 therein having an enlarged screw-threaded counter-bore opening outwardly therefrom to receive a similar fitting 53 of reduced size mounting a fluid transport or operating line 54. The line may be connected to any type of slave mechanism such as a wheel brake cylinder or the like. A residual pressure check valve 60 is disposed within the bore 32 and includes a circular body member 61 disposed in facing engagement with the fitting 50. The body includes a concentric centrally located bore 62 therethrough in which is disposed a relatively reduced diameter elongated rod 64 mounting on its end adjacent to the body a check plate 65 and at its opposite end a spring retainer 66. A spring 67 is disposed about the rod 64 between the retainer 66 and the body 61 to bias the rod 64 towards the left, as viewed in FIG. 2, to maintain the plate 65 against the body 61 in sealing relation to the bore 62 so as to prevent back flow of fluid from the line 54 into the cylinder.

A piston 70 is reciprocably mounted within the bore 32 of the cylinder and includes a pair of spaced inner and outer cylindrical land portions 72 and 73, respectively, and an intermediate cylindrical land portion 74. The lands are interconnected by a pair of spaced reduced diameter spool portions 75. The piston further includes an axial longitudinally extended bore 76 therein opening outwardly adjacent to the inner end of the cylinder and extending toward the opposite end thereof to terminate in a blind end 77 short of the outer land 73. The bore 76 is of a diameter loosely to receive the push rod 17 of the vacuum power unit in abutting relation to the blind end 77 thereof. The lands define a pair of spaced annular compartments 78 and 79 about the spool portions within the bore 32. The compartment 78 is in continuous communication with the bypass port 46 during the entire operating stroke of the piston as the compartment 79 continuously communicates with the exhaust port 48. An annular groove 80 is formed within the bore 32 of the cylinder closely adjacent to the inner end thereof in which is disposed a snap ring 82 to prevent movement of the piston outwardly of the inner end of the bore. Circumferentially extended ridges 83 are disposed about each of the spool portions 75 of the piston closely adjacent the inner land 72 and the intermediate land 74 to form annular grooves 84 thereabout individually receiving seal washers 85 providing a substantially fluid-tight seal against the bore 32. An annular cup-type washer 86 having an outer periphery in substantially fluid-tight sealing relation to the bore 32 is disposed in facing engagement with the outer end of the piston adjacent to the outer land 73. A compression spring 87 is disposed within the bore 32 between the body 61 of the check valve 60 and the cup washer 86 normally to maintain the piston in the brake off position to the left, as viewed in FIGS. 1 and 2, against the snap ring 82.

*Operation*

The operation of the described embodiment of the subject invention is believed clearly apparent and is briefly summarized at this point. With the master cylinder 10 and the vacuum power brake unit 11 in the static condition, shown in FIGS. 1 and 2, the spring 87 maintains the piston 70 to the left against the snap ring 82 which along with the conical spring 18 positions the brake pedal linkage 24 to the brake off position. At this time, the check valve 60 is closed to trap and maintain a full column of fluid in the operating or brake line 54. The fluid compensating orifice 47 concurrently provides communication between the reservoir 40 and the outer end of the bore while the by-pass port 46 provides communication between the reservoir and the compartment 78 between the outer land 73 and the intermediate land 74 of the piston. The compartment 79 between the inner land 72 and the intermediate land 74 is open to the atmosphere through the exhaust port 48 in the cylinder. Any leakage of the fluid in the compartment 78 past the seal ring 85 and the intermediate land 74 is thereby readily exhausted through the exhaust port 48.

Upon actuation of the brake linkage 24 to apply the brakes, the vacuum valve operating rod 22 is positioned to the right to actuate the control valve 20 in the well-known manner to provide communication between the vacuum inlet tube 21 with the right side of the vacuum cylinder housing 12. Atmospheric pressure on the left hand side of the power piston 16 causes it to move to the right, as viewed in FIG. 1, against the spring 18. Such movement carries the push rod 17 therewith to slide the piston 70 to the right, as viewed in FIG. 3. Upon initial movement of the piston, the compensating orifice 47 is closed by the cup washer 86 and the outer land 73 whereby fluid is trapped within the outer end of the bore 32. With continued application of the brake linkage, the piston is moved further to the right compressing the spring 87. The fluid trapped therein acts upon the spring retainer 66 to compress the spring 67 and open the check valve 60. Fluid under pressure is thereby forced outwardly of the cylinder through the brake actuating line 54. Brake application is complete when the piston 70 reaches the end of its stroke as by the spring 87 compressing to a solid state or by other suitable stop adjustments, not shown, within the brake linkage 24. It is noted that during the entire stroke of the piston, the port 48 is continually communicated with the compartment 79 within the valve and the fluid by-pass 46 is continuous communication with the compartment 78. It is significant, therefore, that the compartment 79 provides an intermediate pressure zone between the low pressure vacuum within the inner end of the cylinder bore and the fluid compartment 78 open to the reservoir 40. With this arrangement any leakage from the fluid compartment is readily exhausted through the exhaust port 48. Further, with any failure of the seal ring 85 adjacent to the intermediate land 74 of the piston the intermediate pressure zone insures that no foreign substance other than air will be drawn into the vacuum chamber 12 of the power brake unit. In conventional devices of this type such low pressure is capable of drawing residual fluid through the most minute hole which developes in the seals causing complete brake failure. However, with the improved structure of the present invention any air drawn into the power unit from the intermediate pressure zone compartment 79 causes only a slight rise in the vacuum chamber pressure with no adverse effect on engine operation or on the seals. Thist also greatly extends the period between seal replacement.

Upon release of the brake linkage 24, the pistons 16 and 70 are returned to the positions of FIG. 1 by their respective return springs 18 and 87. During such movement, fluid flows from the reservoir through the by-pass port 46, through the compartment 78 of the piston 70 and around the land 73 and the cup washer 86 to the outer end of the cylinder bore 32. Thus, any fluid losses in the brake lines due to leakage is replenished. After complete brake release, any thermal expansion in the brake lines which might cause their indavertent application is relieved through the compensating port 47 into the reservoir. With initial movement of the piston towards th left, as viewed in FIG. 3, during brake release, the pressure in the outer end of the cylinder bore 32 is relieved causing the check valve 60 to close to trap a column of operating fluid in the line 54. Such arrangement provides instantaneous actuation of the brakes upon any subsequent reactuation of the brake linkage 24.

It will be apparent that the compartment 79 is always at atmospheric pressure. Thus, the pressure differential tending to cause leakage past the washer 85 in the land portion 72 is never greater than the difference between atmospheric pressure and the vacuum in the housing 12. Similarly, the pressure differential tending to cause leakage past the seal in the land 74 is never greater than the difference in pressure between the compartment 78 and atmospheric pressure. Thus, in the device of the present invention, leakage is greatly reduced because of the minimizing of pressure differentials on opposite sides of the seals. It will be noted that in prior art devices for the purposes, the seals are subjected to the total pressure differential between that in the bore 32 and the vacuum in the housing 12. The effect of the addition of the compartment 79 and the port 48 to the atmosphere is to minimize leakage, increase dependability, and improve safety.

From the foregoing, it is readily apparent that the improved master cylinder of the present invention provides an effective means of preventing the intermixing of the actuating and operating pressures contained therein and exhausts any residual fluid leakage therefrom in a controlled manner to prevent contamination of the associated mounting structure. Also when the cylinder of the present invention is adapted to power brake applications, as herein described, such leakage is effectively precluded from intermixing into the low pressure or vacuum actuating chamber of the power unit as opposed to conventional devices of this kind, wherein such leakage is drawn through the power unit and into the engine of the vehicle.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A master cylinder for hydraulic systems comprising a housing having a cylindrical bore therein providing opposite high and low pressure ends and a port opening to the atmosphere through the housing intermediate said ends of the bore, a fluid reservoir integral with the housing having an opening communicating with the bore intermediate its ends and spaced from said port, and a piston having alternate land and reduced diameter spool portions slidably disposed within the bore, said spool portions defining longitudinally spaced fluid and air compartments individually continually communicating with said opening into the reservoir and said port to the atmosphere respectvely, whereby leakage of fluid from said fluid compartment into the air compartment is exhausted through said port to preclude leakage of such fluid from the low pressure end of the bore.

2. A master cylinder for hydraulic systems actuated by vacuum control means comprising a housing having a cylindrical bore therein providing opposite high and low pressure ends and a port opening to the atmosphere through the housing intermediate opposite ends of the bore, said low pressure end communicating with such vacuum means; a fluid reservoir integral with the housing having an opening communicating with the bore intermediate its ends and spaced from said port, and a piston having alternate land and reduced diameter spool portions connected to said vacuum means for slidably positioning the piston within the bore, said spool portions defining longitudinally spaced fluid and air compartments individually continually communicating with said opening into the reservoir and said port to the atmosphere respectively, whereby leakage of fluid from said fluid compartment into the air compartment is exhausted through said port to preclude leakage of such fluid from the fluid compartment into said vacuum means.

3. In a master cylinder for hydraulic brake systems actuated by power means providing a vacuum chamber operationally associated therewith; the combination of a housing having a cylindrical bore therein providing a low pressure end communicating with such vacuum chamber and an opposite high pressure end, said housing including a port opening to the atmosphere intermediate said ends of the bore, a fluid reservoir integral with the housing having an opening communicating with the bore diametrically opposite and longitudinally spaced from said port intermediate its ends, said reservoir having further communication with the bore through an orifice closely longitudinally spaced from said opening therein; a piston operationally associated with said power means having a pair of opposite circular end lands and an intermediate land therebetween slidably fitted within the bore, said lands being interconnected by reduced diameter spool portions defining opposite annular compartments within the bore, means disposed adjacent to each of said lands about the spool portions in substantially fluid-tight sealing relation with the bore, the compartment nearest said high pressure end of the bore being continuously in communication with said reservoir through the opening therebetween and the compartment adjacent to said low pressure end of the bore being in continuous communication with the atmosphere through said port in the housing, a fluid transport line releasably connected to the high pressure end of the bore, retarding valve means interposed between said high pressure end of the bore and the fluid transport line, resiliently compressible means interposed between the retarding valve means and the piston normally to bias said piston toward said low pressure end of the bore, and said orifice being closed by movement of the piston toward said retarding valve means against the spring incident to actuation of said power means to pressurize and force fluid outwardly of the bore through said fluid transport line, and said compartment adjacent to the low pressure end of the bore concurrently providing an atmospheric pressure zone to preclude the entry of residual fluid from the compartment communicating with reservoir into said vacuum chamber.

References Cited in the file of this patent

UNITED STATES PATENTS

| 1,389,300 | Gasche | Aug. 30, 1921 |
| 1,781,869 | Bragg et al. | Nov. 18, 1930 |
| 2,373,272 | Stelzer | Apr. 10, 1945 |
| 2,429,390 | Case | Oct. 21, 1947 |
| 2,688,338 | Newell | Sept. 7, 1954 |
| 2,902,829 | Verbrugge | Sept. 8, 1959 |
| 2,912,071 | Javor | Nov. 10, 1959 |

FOREIGN PATENTS

| 793,837 | Great Britain | Apr. 23, 1958 |